United States Patent [19]
Cobb et al.

[11] Patent Number: 6,094,210
[45] Date of Patent: Jul. 25, 2000

[54] METHOD AND APPARATUS FOR FOCUSING

[75] Inventors: Joshua M. Cobb, Victor; David Kessler, Rochester, both of N.Y.

[73] Assignee: Eastman Kodak Company, Rochester, N.Y.

[21] Appl. No.: 08/865,792

[22] Filed: May 30, 1997

[51] Int. Cl.[7] .................................................. B41J 2/435
[52] U.S. Cl. ......................... 347/256; 347/241; 359/834; 359/205
[58] Field of Search .................................. 347/241, 256, 347/242, 257; 359/831, 833, 834, 205; 369/44.11, 44.29; 356/356, 371; 250/216

[56] References Cited

U.S. PATENT DOCUMENTS

| | | | |
|---|---|---|---|
| 5,002,365 | 3/1991 | DeJager et al. | 359/618 |
| 5,015,096 | 5/1991 | Kowalski et al. | 356/371 |
| 5,170,278 | 12/1992 | Wada et al. | 359/212 |
| 5,191,485 | 3/1993 | Kahle | 359/834 |
| 5,248,992 | 9/1993 | Ferschl | 347/258 |
| 5,295,125 | 3/1994 | Oonishi et al. | 369/44.29 |
| 5,334,830 | 8/1994 | Fukuyama et al. | 250/216 |

*Primary Examiner*—N. Le
*Assistant Examiner*—Hai C. Pham
*Attorney, Agent, or Firm*—Nelson Adrian Blish

[57] ABSTRACT

A focusing apparatus (10) for maintaining a first beam in focus at an imaging plane comprising a first reflective surface (14) which redirects the first beam from a first direction to a second direction wherein the second direction is oriented approximately 90° from the first direction; a second reflective surface (24) which redirects the first beam from the second direction to a third direction wherein the third direction is oriented approximately 90° from the second direction; a third reflective surface (26) which redirects the first beam from the third direction to a fourth direction wherein the fourth direction is oriented approximately 90° from the third direction; a fourth reflective surface (32) which redirects the first beam from the fourth direction to a in a fifth direction wherein the fifth direction is oriented approximately 90° from the fourth direction; and wherein the second reflective surface (24) and the third reflective surface (26) are movable as a unit, with respect to the first reflective surface (14) and the fourth reflective surface (32). In one embodiment, second reflective surface (24) and third reflective surface (26) are incorporated in a roof prism (20).

9 Claims, 1 Drawing Sheet

METHOD AND APPARATUS FOR FOCUSING

FIELD OF THE INVENTION

This invention relates to a focusing apparatus in general, and more particularly, to an autofocusing device for laser printers.

BACKGROUND OF THE INVENTION

In one type of thermal printer, a dye-donor element is placed over a medium for receiving an image. The superimposed elements cooperate with a printhead having one or more lasers. When a particular laser is energized, it causes dye from the donor to transfer to the medium. The density or darkness of the colored dye transferred to the medium is a function of the energy delivered from the lasers to the donor. The lasers are usually arranged in an array of diode lasers which can be selectively actuated to direct radiation onto the dye donor. The laser array forms successive swaths of scan lines on the medium as the laser array and the medium are moved relative to each other.

Because of the high resolution of such imaging systems, there is a very small depth of focus. The focus position can vary due to various characteristics of the system, for example, flatness of donor and medium, roundness of drum, etc. This creates a need for detecting the distance from the laser to the donor and changing the focus position without compromising the image quality.

There are several different methods for changing the focus. One method is moving the donor. However, this is very cumbersome. The donor and medium are attached to a large rotating drum which has significant inertia, which makes this option difficult to accomplish rapidly. Another option is moving the reduction lens, which focuses the laser on the donor. This is easier than moving the donor, however, the reduction lens is also relatively massive, and it is again difficult to move rapidly.

It is also possible to move one or more elements in the reduction lens. This is feasible, and is currently used in some systems. In one prior art apparatus, the last lens element in a nine element reduction lens is mounted on flexures and is moved relative to the drum. This type of system, however, places restrictions on the size of the last lens element. Also, moving a lens element is difficult to do without adding aberration to the image. Another disadvantage is that if an autofocusing mechanism is incorporated in such a system, it must be near the drum, which rotates at high speed and creates air currents that interfere with moving the lens element to the appropriate position.

Another alternative is moving the laser to adjust the focus, however, this also creates problems. For example, in some laser printers, laser beams are directed through fibers which are aligned in an array. The fiber faces are then imaged to the donor plane. Multi-mode fibers used in this system have diameters of $50\mu$ to $100\mu$. The spot size needed for graphic arts printing is between $10\mu$ and $20\mu$, therefore, the optical system used must image the fibers at a magnification of between 0.5x and 0.25x. Moving the fibers to change the focus position presents several challenges. First, to change the focus position at the donor plane by a distance "X" the fibers must be moved by a distance equal to X times the square of the magnification. Thus, if the optical system reduces the array of fibers by a factor of four, the fiber array would be required to move 16 mm to change the image position by 1 mm. It is also difficult to move the fibers without breaking them or tilting them.

SUMMARY OF THE INVENTION

It is an object of the present invention to overcome the problems in the prior art discussed above and to provide an improved focusing apparatus.

It is also an object of the present invention to provide a focusing apparatus for changing the focus distance from a laser to a donor without moving either the lens or the donor. Yet another object of the present invention to provide a focusing apparatus between a fiber array and a lens, which operates without moving either the lens or the fiber array.

In accordance with one aspect of the present invention, there is provided a focusing apparatus for maintaining a first beam in focus at an imaging plane comprising a first reflective surface which redirects the first beam from a first direction to a second direction wherein said second direction is oriented approximately 90° from the first direction. A second reflective surface redirects the first beam from the second direction to a third direction wherein the third direction is oriented approximately 90° from the second direction. A third reflective surface redirects the first beam from the third direction to a fourth direction wherein the fourth direction is oriented approximately 90° from the third direction. A fourth reflective surface redirects the first beam from the fourth direction to a fifth direction wherein the fifth direction is oriented approximately 90° from said fourth direction. The second reflective surface and said third reflective surface are movable as a unit, with respect to the first reflective surface and the fourth reflective surface.

In one embodiment of the invention the reflecting surfaces are comprised of prisms wherein one prism moves with respect to three stationary prisms. In another embodiment a focusing apparatus detects a focus shift and monitors laser power.

An advantage of the present invention is that the focusing apparatus is located at a distance form the donor plane. Another advantage is that the focusing apparatus is not a lens element and consequently has no effect on the image quality as it is moved. Other features and advantages will become apparent upon reference to the following description of the preferred embodiment when read in light of the attached drawings.

DETAILED DESCRIPTION OF THE INVENTION

Figure 1:
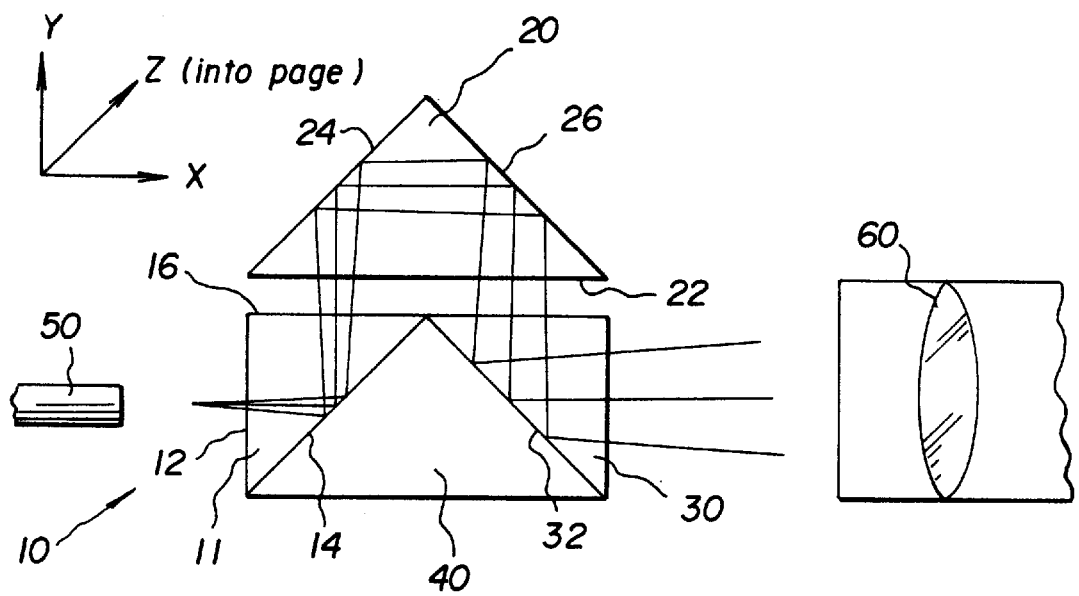
FIG. 1 is an elevational view of a focusing apparatus according to the present invention.

With reference to FIG. 1, there is shown a focusing apparatus 10 constructed in accordance with the present invention. Focusing apparatus 10 is comprised of a first prism 11, second prism 20, third prism 30, and fourth prism 40.

In the preferred embodiment, prisms 11, 30, and 40 are cemented together. Suitable bonding materials include UV curable adhesives, for example, a Norland adhesive, available from the Norland Company. Using this type of adhesive, it has been found desirable to heat the prisms in an oven at approximately 50° C. for approximately 1 hour.

The invention works by changing the distance between the object fiber array 50 and the reduction lens. The fiber array 50 is located at a face 12 of prism 11. The light is reflected off of the interface 14 of prism 11 and prism 40. Interface 14 has been coated with a highly reflective coating, and exits a second face 16 of prism 11. The light beam then enters prism 20 through its hypotenuse 22 and is reflected off first face 24 and second face 26 of prism 20 by total internal reflection. Although the actual angles of incidence for several rays of the beam will vary somewhat from 45°, the various angles of incident shall be greater than the so-called critical angle for total internal reflectance, approximately 45°. In the preferred embodiment, a high index glass is used which gives a critical angle of 34°. Depending on the index of refraction, the critical angle may vary from approximately 30°–45°. In an alternative embodiment, first face 24 and second face 26 are coated with a highly reflective coating.

Light exits hypotenuse 22 before entering prism 30. It reflects off of the coated interface of prisms 30 and 40 and exits prism 30 as it travels towards the objective lens 60.

A focus shift is produced by moving prism 20 relative to the cemented group of prisms (11, 30, and 40). Because the light traverses the gap between the movable prism 20 and the cemented group of prisms 11, 30, and 40 twice, a movement of prism 20 by 1 mm causes an object distance shift of 2 mm. Another way of stating this is that movement of prism 20 by a distance d results in a change in focus at an image plane of $2dm^2$, where m is equal to a magnification factor.

There is an advantage of using prisms instead of mirrors. Since the prisms have a refractive index greater than 1.0, the optical path length for the prisms is longer than the optical path length in air. In other words, light traveling through a prism made of a glass with a refractive index of 1.5 would need to travel 1.5 times the glass thickness through air for it to have traveled the equivalent optical path. The net result of this is that going through a set of high index prisms keeps the size of the reflecting surfaces small, and thus helps to keep the entire system compact.

Figure 2:
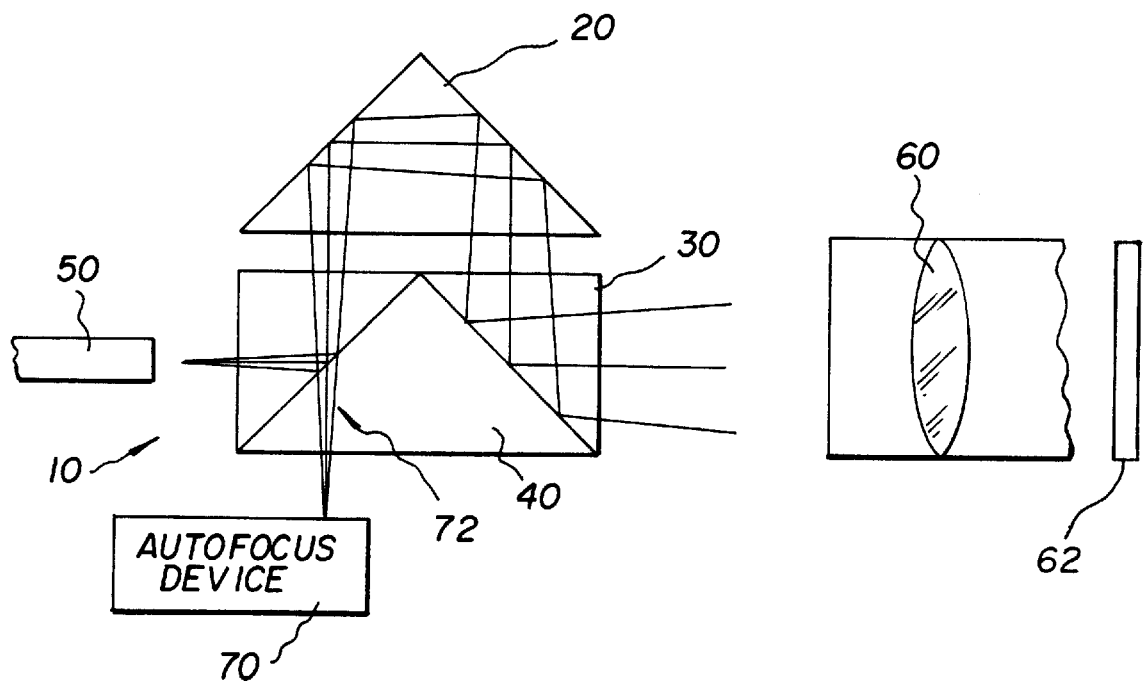
FIG. 2 is an elevational view the focusing apparatus shown in FIG. 1 incorporating an auto-focus device.

FIG. 2 illustrates an alternate embodiment of the invention. Detecting a focus shift is usually accomplished by imaging an additional autofocus device 70, including a laser and detecting device, a best focus position. An autofocus device continuously focuses the laser beam as the images form to assure that variations in the thickness of the donor and medium, as well as other perturbations in the system, do not de-focus the laser beam and adversely affect the image density, or the sharpness of the image. Although the autofocus can be accomplished by reflecting the laser beam off the top surface of the donor, better results are obtained by reflecting the autofocus beam off an aluminized surface on the media 62, which functions as a fifth reflective surface, which is closer to the dye layer of the donor than the front surface of the donor. The autofocus beam is generated from a laser diode having an output typically between 900 nm–1050 nm. This contrast with the laser writing beams, which have an output in the range of 800 nm–880 nm, which wavelengths are absorbed by donor member. The autofocus beam, at, for example, 960 nm–970 nm, passes through the donor member and is reflected off the aluminized surface of the receiver. The autofocus beam takes a path through the prisms similar to the path followed by the laser beam, however, the interface between prism 11 and prism 40 is coated to reflect only 50% of the light from the autofocus laser. A portion of the autofocus laser returns and passes through that interface and exits the hypotenuse of prism 40 to an autofocus detection device which is well known in the art. (See U.S. Pat. No. 5,248,992, *High Numerical Aperture Image Forming Apparatus Using Optical Fibers for Both Writing and Focus Control,* assigned to Eastman Kodak.)

A third process that this prism system incorporates is a laser power monitoring process. A small portion of the writing lasers passes through the interface between prism 11 and prism 40. It is then reflected off of the interface between prism 30 and prism 40, and it exits the hypotenuse of prism 40. This energy is then continually monitored by a detector to ensure a consistent power.

This system has several advantages over prior art. First, an optical lens element is not in motion. When a curved lens element is moved in a system relative to the rest of the lenses in the system, e.g., a zoom lens, there is a potential for image quality to be compromised. The optical component that is moved in this invention is, in essence, a flat plate. There is minimal impact to image quality in this configuration. Another advantage of this system allows the mechanical mechanism which changes the focus position to be located away from the rotating drum at the image plane. This makes the mechanical design, mounting, and alignment easier.

Yet another advantage is provided by having a retro-reflecting prism 20, the system is insensitive to tilt about the z-axis as shown in FIG. 1. An additional advantage is provided by using a "double pass" type of system, the prism only has to be moved by half of the square of the magnification rather than by the full square of the magnification.

The invention lends itself to a compact design that can incorporate autofocus detection and energy detection in a minimal amount of space. Also, the mass of the moving prism is much less than the mass of the fiber array and its associated mechanics. If it is desired to change the optical path between the fiber array and the lens, it is much easier to move the prism than to move the fiber array.

The invention has been described in detail with particular reference to the preferred embodiment thereof, but it will be understood that variations and modifications can be effected within the spirit and scope of the invention. For example, the reflecting surfaces need not be contained on the face of a prism. In a broader aspect of the invention, these reflecting surfaces may be mirrors, and not affixed to highly reflective glass prisms at all.

| PARTS LIST | |
|---|---|
| 10 | focusing apparatus |
| 11 | first prism |
| 12 | face |
| 14 | interface |
| 16 | second face |
| 20 | second prism |
| 22 | hypotenuse |
| 24 | first face |
| 26 | second face |
| 30 | third prism |
| 32 | fourth reflective surface |
| 40 | fourth prism |
| 50 | fiber array |
| 60 | objective lens media 62 |
| 70 | autofocus laser |

What is claimed is:

1. A focusing apparatus for maintaining a first beam in focus at an imaging plane comprising:

a first reflective surface which redirects said first beam from a first direction to a second direction wherein said second direction is oriented approximately 90° from said first direction;

a second reflective surface which redirects said first beam from said second direction to a third direction wherein said third direction is oriented approximately 90° from said second direction;

a third reflective surface which redirects said first beam from said third direction to a fourth direction wherein said fourth direction is oriented approximately 90° from said third direction;

a fourth reflective surface which redirects said first beam from said fourth direction to a fifth direction wherein said fifth direction is oriented approximately 90° from said fourth direction;

wherein said second reflective surface and said third reflective surface are movable linearly as a unit, with respect to said first reflective surface and said fourth reflective surface;

wherein said first direction, said second direction, said third direction, and said fourth direction are located in approximately the same plane;

wherein said first reflective surface is located at a plane formed by a face of a first prism and a face of a fourth prism; and wherein said first reflective surface is partially transmissive to a second beam, and said second beam is colinear with said first beam.

2. A focusing apparatus as in claim 1, wherein said second and third reflective surfaces are surfaces of a prism.

3. A focusing apparatus as in claim 1, wherein said fourth reflective surface is located at a plane formed by a face of a third prism and a face of a fourth prism.

4. A focusing apparatus as in claim 1, wherein:

said second beam passes through said first reflective surface;

said second reflective surface redirects said second beam to said third direction;

said third reflective surface redirects said second beam to said fourth direction;

said fourth reflective surface redirects said second beam to said fifth direction; and a fifth reflective surface reflects said second beam along a reciprocal path to said first reflective surface and wherein said first reflective surface transmits at least a portion of said second beam to an autofocus device to provide distance information.

5. A focusing apparatus as in claim 4, wherein said first beam has a first wavelength and said second beam has a second wavelength, and wherein said second wavelength is not equal to said first wavelength.

6. A focusing apparatus for maintaining a first beam in focus at an imaging plane comprising:

a first prism which redirects said first beam from a first direction to a second direction wherein said second direction is oriented approximately 90° from said first direction;

a second prism which redirects said first beam from said second direction to a third direction wherein said third direction is oriented approximately 180° from said second direction;

a third prism which redirects said first beam from said third direction to a fourth direction wherein said fourth direction is oriented approximately 90° from said third direction;

wherein said second prism is movable linearly with respect to said first prism and said third prism such that movement of said second prism by a distance d results in a change in focus at said imaging plane of $2dm^2$, where m is equal to a magnification factor, wherein said first direction, said second direction, said third direction, and said fourth direction are located in approximately the same plane;

wherein said first and third prism form a unit; and wherein a surface of said first prism is partially transmissive to a second beam, and said second beam is colinear with said first beam.

7. A focusing apparatus as in claim 6, wherein said focusing apparatus comprises an optical system for a laser printing apparatus.

8. A method of focusing a first beam comprising the steps of:

changing a path of said first beam from a first direction to a second direction;

directing a path of a second beam along said second direction, said second beam being colinear with said first beam;

changing the path of said first beam and said second beam from said second direction to a third direction by reflection of said first beam and said second beam from surfaces of a prism;

changing the path of said first beam and said second beam from said third direction to a fourth direction;

wherein said first direction, said second direction, said third direction, and said fourth direction are located in approximately the same plane;

changing the path of said second beam and directing it on a reciprocal path; and sensing said second beam and determining amount of movement of said prism to focus said first beam.

9. A focusing apparatus as in claim 8, wherein said third direction is oriented approximately 180° from said second direction.

* * * * *